United States Patent [19]

Morimoto et al.

[11] Patent Number: 5,221,586
[45] Date of Patent: Jun. 22, 1993

[54] POWER GENERATION SYSTEM USING FUEL CELLS

[75] Inventors: Hiromasa Morimoto, Tokyo; Hiroyoshi Uematsu, Yokohama; Satoshi Hatori, Ibaraki; Kazunori Kobayashi, Yokohama; Tomoji Hikita, Tokyo; Kenichi Shinozaka, Osaka; Shigeto Nakagawa, Tokai, all of Japan

[73] Assignees: Ishikawajima-Harima Heavy Industries Co., Ltd.; Tokyo Gas Co., Ltd., both of Tokyo; Osaka Gas Co., Ltd., Osaka; Toho Gas Co., Ltd., Nagoya, all of Japan

[21] Appl. No.: 755,058

[22] Filed: Sep. 5, 1991

[30] Foreign Application Priority Data

Sep. 19, 1990 [JP] Japan ............................ 2-249312
Jul. 26, 1991 [JP] Japan ............................ 3-208937

[51] Int. Cl.⁵ .......................................... H01M 8/06
[52] U.S. Cl. .................................. 429/20; 429/17
[58] Field of Search .......................... 429/17, 19, 20

[56] References Cited

U.S. PATENT DOCUMENTS

| 4,080,487 | 3/1978 | Reiser | 429/16 |
| 4,933,242 | 6/1990 | Koga et al. | 429/19 |
| 4,983,470 | 1/1991 | Kimura et al. | 429/16 |
| 5,094,926 | 3/1992 | Kobayashi et al. | 429/20 |

FOREIGN PATENT DOCUMENTS

| 0170277 | 2/1986 | European Pat. Off. . |
| 0269877 | 6/1988 | European Pat. Off. . |
| 59-149663 | 8/1984 | Japan . |
| 61-019073 | 1/1986 | Japan . |
| 1-225066 | 9/1989 | Japan . |

OTHER PUBLICATIONS

Patent Abstracts of Japan, vol. 10, No. 168 (E-411) (2224) Jun. 14, 1986.
Patent Abstracts of Japan, vol. 13, No. 544 (E-855) (3892) Dec. 6, 1989.
Patent Abstracts of Japan, vol. 8, No. 285 (E-287) (1722) Dec. 26, 1984.
Patent Abstracts of Japn, vol. 10, No. 259 (E-434) Sep. 4, 1986.
Patent Abstracts of Japan, vol. 7, No. 140 (E-182) (1285) Jun. 18, 1983.
Patent Abstracts of Japan, vol. 12, No. 26 (E-577) Jan. 26, 1988.

Primary Examiner—Stephen Kalafut
Attorney, Agent, or Firm—Trexler, Bushnell, Giangiorgi & Blackstone, Ltd.

[57] ABSTRACT

The power generation system includes a reformer and two fuel cell stacks. The reformer and the fuel cell stacks are provided in series. Fuel gas produced by the reformer is introduced to a first anode of the first fuel cell stack. Gases discharged from the first anode are directly introduced to a second anode of the second fuel cell stack. Air is introduced to a first cathode of the first fuel cell stack. Gases discharged from the first cathode are cooled by a cooling device and then introduced to a second cathode of the second fuel cell stack. Gases discharged from the second anode and gases discharged from the second cathode are introduced to a heating chamber of the reformer. Gases discharged from the heating chamber are introduced to a steam generator to produce steam used for reformation and then recirculated to the first cathode.

20 Claims, 8 Drawing Sheets

POWER GENERATION SYSTEM USING FUEL CELLS

BACKGROUND OF THE INVENTION

1. Technical Field

The present invention relates to a power generation system using fuel cells which directly convert chemical energy of fuel into electric energy, and particularly to a power generation system using molten carbonate fuel cells.

2. Background Art

Many power generation systems using fuel cells have been developed, and one of such conventional power generation systems is shown in FIG. 6 of the accompanying drawings. This power generation system uses natural gas as a raw material gas to be reformed to fuel gas. A fuel cell stack I generally includes a plurality of fuel cell elements stacked one after another via separators (not shown). In FIG. 6, there is shown only one fuel cell element for illustrative purpose. The fuel cell element includes an electrolyte plate 601, a cathode 602 and an anode 603, with the electrolyte plate 601 sandwiched by the cathode 602 and the anode 603. Air A is compressed by a compressor 604, cooled by a cooling device 605, further compressed by another compressor 606 and preheated by an air preheater 607 before it is introduced to the cathode 602 of the fuel cell stack I by an air feed line 608. Part of the air A is fed to a combustion chamber of a reformer 610 by a branch line 609. Gases discharged from the cathode 602 (called "cathode gas") are forced into a turbine 612 through a cathode gas line 611, then into the air preheater 607 and expelled to the atmosphere. On the other hand, fuel gas which is obtained by reforming natural gas (CH$_4$) NG is introduced to the anode 603 of the fuel cell stack I. Natural gas NG flows through natural gas preheaters 613, 614 and a desulfurizer 615 before it reaches the reformer 610. Natural gas is reformed to the fuel gas by the reformer 610 and fed to the anode 603 by a fuel gas feed line 616. Gases discharged from the anode 603 (called "anode gas") are forced into a heat exchanger 617, the natural gas preheater 614, a steam generator 618, another natural gas preheater 613, a condenser 619 and a gas-liquid separator 620. In the gas-liquid separator 620, H$_2$O is separated from the anode gas, and the H$_2$O-removed anode gas is pressurized by a blower 621 and then introduced to a combustion chamber of the reformer 610 by a line 622 extending through the heat exchanger 617. Gases discharged from the reformer 610 are introduced to the cathode 602. H$_2$O (left bottom in the illustration) separated by the gas-liquid separator 620 is pressurized by a pump 623 (right in the illustration) and fed to a water heater 624. H$_2$O is heated to steam in the heater 624 and transferred by a line 625 via the steam generator 618 to merge with natural gas NG before it enters the reformer 610. Numeral 626 designates a blower for cathode recirculation.

When the fuel cell stack I is operated for power generation, a following reaction takes place in the reformer 610:

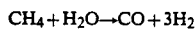

On the other hand, a following reaction occurs at the cathode 602 of the fuel cell stack I:

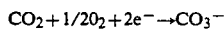

Upon this reaction, as seen in the above equation, carbonate ion CO$_3^-$ is produced. The carbonate ion CO$_3^-$ migrates in the electrolyte plate 601 and reaches the anode 603. Since the fuel gas FG prepared by the reformer 610 is fed to the anode 603 and the fuel gas FG contacts the carbonate ion CO$_3^-$, following reactions occur:

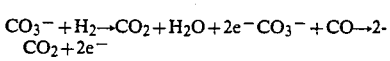

Therefore, 5CO$_2$ and 3H$_2$O are discharged from the anode 603 as the anode gas.

However, the conventional power generation system has following problems:

Gas flow rates through the cell elements are not always homogeneous in the height direction (vertical direction) of the fuel cell stack as shown in FIG. 7, and gas flow rates in each cell element are not homogeneous in the width direction (horizontal direction) of the fuel cell stack if the width of the cell element (or fuel cell stack) is large as shown in FIG. 8. Because of the inhomogeneous flow rates, some fuel cell elements suffer from insufficient fuel if a high fuel utilization factor is required to the fuel cell system. This results in an under voltage (an output voltage of the system is lower than a designed or desired value). If a stable operation of the fuel cell stack is desired, i.e., if the under voltage should be avoided, the fuel utilization factor should be lowered. "LIMIT" in FIGS. 7 and 8 indicate this. In addition, since the conventional power generation system cools the fuel cell stack I with sensible heat of the cathode, the temperature of the fuel cell stack entrance cannot be set high. Consequently, the S/C ratio (steam/carbon ratio) cannot be set low (If the S/C ratio is low, deposition or precipitation of carbon will not be prevented), and generally the fuel cell stack is operated with its entrance temperature being about 570° C. and the S/C ratio being about 3.

Another example of conventional power generation system using a fuel cell stack is shown in FIG. 9. The fuel cell stack I includes a plurality of fuel cell elements stacked one after another via separators (not shown) and each fuel cell element includes an anode 903, a cathode 902 and an electrolyte plate 901. The electrolyte plate 901 is a porous substance soaked with carbonate and therefore this fuel cell is called a molten carbonate fuel cell. In FIG. 9, there is illustrated one fuel cell element for illustrative purpose. Air A (oxidizing gas) is supplied to the cathode 902 of the fuel cell stack I and fuel gas FG is supplied to the anode 903 of the same. A line 905 is connected to an entrance of the anode 903 of the fuel cell stack I such that the fuel gas FG produced by a reformer 904 reaches the anode 903. Natural gas NG (raw material gas to be reformed) is desulfurized by a desulfurizer 907 on a natural gas feed line 906, preheated by a natural gas preheater 908 and introduced to a reforming chamber 904a of the reformer 904. Natural gas NG is reformed to the fuel gas FG in the reforming chamber 904a and introduced into the anode 903. On the other hand, the air A is introduced to a filter 909, pressurized by an air blower 911 on an air feed line 910, heated by an air preheater 912 and introduced to an entrance of the cathode 902 of the fuel cell stack I.

Gases discharged from the anode 903 (called "anode gas") flow into a catalyst combustor 914 through an anode gas line 913. Residual combustible matters among the anode gas (not all the matters are used in the reaction at the anode 903) are burned in the catalyst combustor 914 using part of the cathode gas (gases discharged from the cathode 902) introduced to the combustor 914 by a line branched from a cathode gas line 915. In order to direct heat produced upon this combustion to a heating chamber 904b of the reformer 904 so as to use this heat for the reforming reaction in the reforming chamber 904a, the catalyst combustor 914 and the heating chamber 904b are connected with each other by a combustion exhaust gas line 916. Another part of the cathode gas is introduced to the air preheater 912 by the cathode gas line 915 before it is expelled to the atmosphere. A cathode gas recirculation blower 918 directs part of the cathode gas to the entrance of the cathode 902 through a recirculation line 917. In order to use sensible heat of gases discharged from the heating chamber 904b of the reformer 904 for generation of steam, these gases are introduced to a steam super heater 920, a steam generator 921 and another steam generator 922 by a line 919. The gases then flow through a condenser 923 and a gas-liquid separator 924. The steam generator 922 produces steam to be used in the reformation in the reformer 904. Clean water $H_2O$ processed by a water processor 925 flows into the gas-liquid separator 924. Water separated by the gas-liquid separator 924 is pressurized by a water feed pump 926 together with the clean water $H_2O$ and introduced to the steam generators 921 and 922. Steam produced by the steam generator 921 is recovered by a steam recovering line 927. Steam produced by the steam generator 922 is super heated by the steam super heater 920 and fed into the natural gas feed line 906 by a steam line 928. Gases separated by the gas-liquid separator 924 flow toward the air blower 911 on the air feed line 910.

As the power generation starts using the system having the above-described structure, the natural gas NG is introduced to the reforming chamber 904a of the reformer 904 via the natural gas preheater 908 and a following reaction takes place in the reforming chamber 904a:

$$CH_4 + H_2O \rightarrow CO + 3H_2$$

CO and $3H_2$ are supplied as the fuel gas to the anode 903 of the fuel cell stack I. On the other hand, the air A preheated by the air preheater 912 is introduced to the cathode 902 of the fuel cell stack I and a following reaction takes place at the cathode 902:

$$CO_2 + 1/2O_2 + 2e^- \rightarrow CO_3^{--}$$

The carbonate ion $CO_3^{--}$ reaches the anode 903 via the electrolyte plate 901. Since the fuel gas FG has been fed to the anode 903, following reactions are caused at the anode 903:

$$CO_3^{--} + H_2 \rightarrow CO_2 + H_2O + 2e^-$$

$$CO_3^{--} + CO \rightarrow 2CO_2 + 2e^-$$

Thus, electric current flows as a certain electrical load is connected between the cathode 902 and the anode 903.

However, this type of power generation system also has shortcomings. Since the power generation system has only one reformer 904 and only one fuel cell stack I, the reformer 904 should possess a high reforming efficiency or rate. Consequently, the reforming temperature should be high. The reformer 904 generally cannot stand a high temperature with respect to a structural rigidity, and the longevity of the reforming catalyst in the reforming chamber 904a is shortened as the reforming temperature is raised. If the temperature of the reformer 904 is lowered in order to ensure an adequate longevity of the reforming catalyst and the reformer, a high reforming efficiency cannot be expected and a concentration of hydrogen introduced to the anode 903 becomes low. Therefore, it is not possible to obtain a high voltage output from the power generation system.

SUMMARY OF THE INVENTION

An object of the present invention is to raise a total fuel utilization factor of the power generation system whereby an output at a power transmission end is raised even if a fuel utilization factor of one-path is low.

Another object of the present invention is to reduce an amount of steam fed from outside for formation of a raw material gas.

Still another object of the present invention is to burn in a reformer residual combustible matters among an anode gas and use heat produced upon combustion of the combustible components to generate steam thereby increasing an amount of steam to be recovered.

Yet another object of the present invention is to extend a longevity of a reformer and a reforming catalyst placed in the reformer.

According to one aspect of the present invention, there is provided a power generation system using a fuel cell and a reformer having a reforming chamber and a combustion chamber characterized in that there are provided in series a reformer, a first fuel cell and a second fuel cell, that the reforming chamber of the reformer is connected with an anode entrance of the upstream fuel cell, and that anode exit and cathode exit of the downstream fuel cell are connected with the combustion chamber of the reformer.

According to another aspect of the present invention, there is provided a power generation system using a fuel cell and a reformer characterized in that there are provided in series a first (upstream) reformer, a first (upstream) fuel cell, a second (downstream) reformer and a second (downstream) fuel cell, that a reforming chamber of the first reformer, an anode of the first fuel cell, a reforming chamber of the second reformer and an anode of the second fuel cell are connected in series, that anode exit and cathode exit of the downstream fuel cell are connected with a combustion chamber of the second reformer.

According to still another aspect of the present invention, there is provided a power generation system using a fuel cell and a reformer characterized in that a first (upstream) reformer, a first (upstream) fuel cell, a second (downstream) reformer and a second (downstream) fuel cell are provided in series, that a reforming chamber of the first reformer, an anode of the first fuel cell, a reforming chamber of the second reformer and anode of the second fuel cell are connected in series, that cathode gas of the first fuel cell is directly introduced to a combustion chamber of the first reformer, that combustion exhaust gas from the combustion chamber of the first reformer is introduced to a cathode of the second fuel cell, and that anode exit and cathode exit of the second fuel cell are connected with a combustion chamber of the second reformer. In such a system, gases discharged from the combustion chamber of the second reformer may be used as heat source to produce steam and part of the steam so produced may be added to the raw material gas to be reformed before the raw material gas reaches the first reformer.

The raw material gas is introduced to the first reformer and reformed into the fuel gas. The fuel gas is then introduced to the anode of the first fuel cell. If a fuel utilization factor of the first fuel cell is low, i.e., if some or considerable portion of the fuel gas is not used in the anode of the first fuel cell, the remaining fuel gas is used in the next anode (anode of the second fuel cell). Therefore, a total fuel utilization factor is improved as compared with a power generation system having a single fuel cell. Further, gas flow rate distributions across the anode of the first (upstream) fuel cell as well as the second (downstream) fuel cell are improved since the gas flow rate through each anode is higher than a conventional power generation system which has two parallel-provided fuel cells. This advantage is also derived from the in-series connection of the fuel cells. More specifically, when the fuel cells are provided in series, the flow rate across the anode of each fuel cell increases as compared with a case where the fuel cells are provided in parallel. Although the flow rate distribution of the gas at the exit of the upstream anode has a wavelike distribution, the distribution becomes flat when the gas enters the downstream anode. In other words, the gas flow rate distribution of the upstream anode is similar to that of the downstream anode. Therefore, the gas flow rate distribution of the upstream anode and that of the downstream anode are both improved as compared with the conventional parallel system.

An reaction at the anode of the first fuel cell consumes hydrogen of the fuel gas and steam produced upon this reaction is introduced to the reforming chamber of the second reformer. Thus, the reforming rate of the second reformer is improved. As a result, an amount of steam for the reformation is reduced. This leads to a reduction of the S/C ratio. In addition, sensible heat of the cathode gas from the first fuel cell is used as heat for the reformation in the first reformer. Thus, the first reformer serves as an intermediate cooling device to cool the cathode gas. This leads to an elimination of a cooling device for the first fuel cell (Otherwise the cooling device should be provided downstream of the cathode of the first fuel cell). Moreover, since heat which is produced upon combustion of the remaining fuel gas in the anode of the second fuel cell is used in steam generation, an amount of steam recovered is raised.

Other aspects, objects and advantages of the present invention will become apparent by reference to the following detailed description taken in conjunction with the various figures and appended claims.

DESCRIPTION OF THE PREFERRED EMBODIMENTS

Now, preferred embodiments will be described with FIGS. 1 to 5 of the accompanying drawings.

Figure 1:
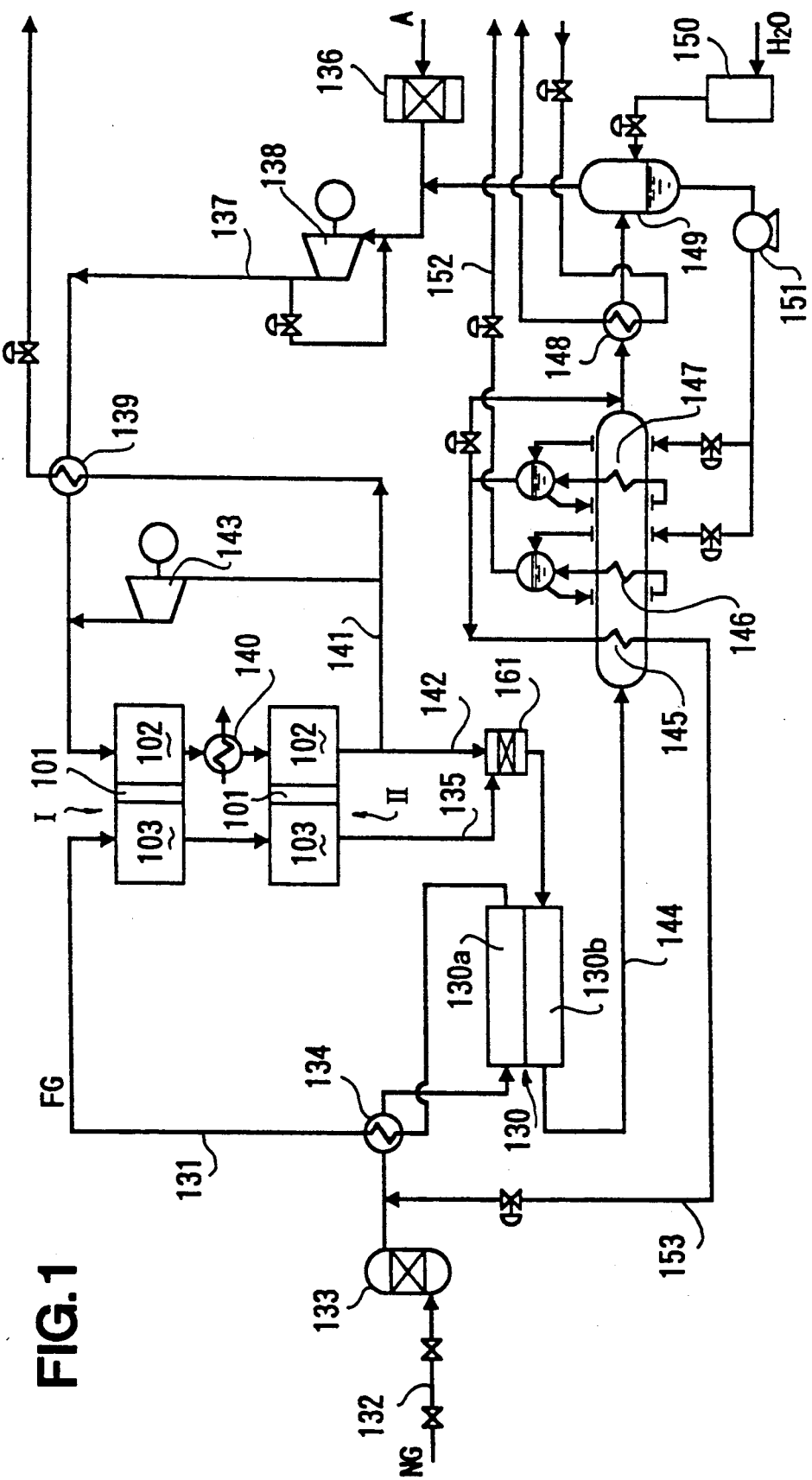
FIGS. 1 to 5 respectively illustrate schematic block diagrams of a power generation system using fuel cells according to the present invention.

Referring first to FIG. 1, illustrated is a power generation system having two fuel cell stacks I and II provided in series. Each fuel stack includes a plurality of fuel cell elements stacked via separators (only one fuel cell element is shown for illustrative purpose). Each fuel cell element includes an electrolyte plate 101, a cathode 102 and an anode 103. The electrolyte plate 101 is sandwiched by the cathode 102 and the anode 103. Air A (an oxidizing gas) is supplied to the cathode 102 of the fuel cell stack I while fuel gas FG is supplied to the anode 103. The anode 103 of the first fuel cell I is connected in series with the anode 103 of the second fuel cell II. A fuel gas feed line 131 is connected to an entrance of the anode 103 of the first fuel cell I such that the fuel gas FG produced in a reformer 130 is introduced to the anode 103. Natural gas NG (a raw material gas) is desulfurized by a desulfurizer 133 provided on a natural gas feed line 132 and introduced to a natural gas preheater 134 before it is supplied to a reforming chamber 130a of the reformer 130. Natural gas NG is reformed to the fuel gas FG in the reforming chamber 130a. The fuel gas FG is used first in the anode 103 of the first fuel cell I and then in the anode 103 of the second fuel cell II. Gases discharged from the anode 103 (called "anode gas") of the second fuel cell II flow into a catalyst combustor 161 through an anode gas line 135 before it reaches a heating chamber 130b of the reformer 130. On the other hand, the air A (oxidizing gas) is introduced to a filter 136, pressurized by an air blower 138 provided on an air feed line 137, preheated by an air preheater 139 before it is supplied to the cathode 102 of the first fuel cell stack I. Gases discharged from the cathode 102 (called "cathode gas") of the first fuel cell stack I are cooled by a cooling device 140 before they are supplied to the cathode 102 of the second fuel cell stack II. The cathode gas from the cathode 102 of the second fuel cell stack II is a high temperature gas and part thereof is branched by a cathode gas line 141. Part of the gas in the cathode gas line 141 is expelled to the atmosphere via the air preheater 139 and the remainder is recirculated to the cathode 102 of the first fuel cell stack I through the air feed line 137 by a cathode gas blower 143. The cathode gas which is not branched by the cathode gas line 141 flows into a line 142 and is introduced to the heating chamber 130b of the reformer 130 via the catalyst combustor 161. Gases discharged from the heating chamber 130b of the reformer 130 flow into an exhaust gas line 144 and pass through a steam super heater 145, a steam generator 146, another steam generator 147, a condenser 148 and a gas-liquid separator 149. The steam generator 147 is used to prepare steam for the reformation in the reformer 130. Clean water $H_2O$ which is processed by a water processing machine 150 is also fed to the gas-liquid separator 149. Water separated by the gas-liquid separator 149 is pressurized by a water feed pump 151 together with the clean water $H_2O$ and introduced to the steam generators 146 and 147. Steam generated in the steam generator 146 is recovered by a steam recovery line 152. Steam generated in the other steam generator 147 is super heated by the steam super heater 145 and introduced to the natural gas feed line 132 by the steam line 153. Surplus steam (not all the steam generated by the steam generator 147 is fed to the natural gas feed line 132) returns to the condenser 148. A top of the gas-liquid separator 149 and an entrance of the air blower 138 on the air feed line 137 are connected with each other so that gases separated by the gas-liquid separator 149 are introduced to the air feed line 137. Meanwhile, no combustion may take place in the heating chamber 130b of the reformer 130 and gases may just pass therethrough in certain cases.

Figure 7:
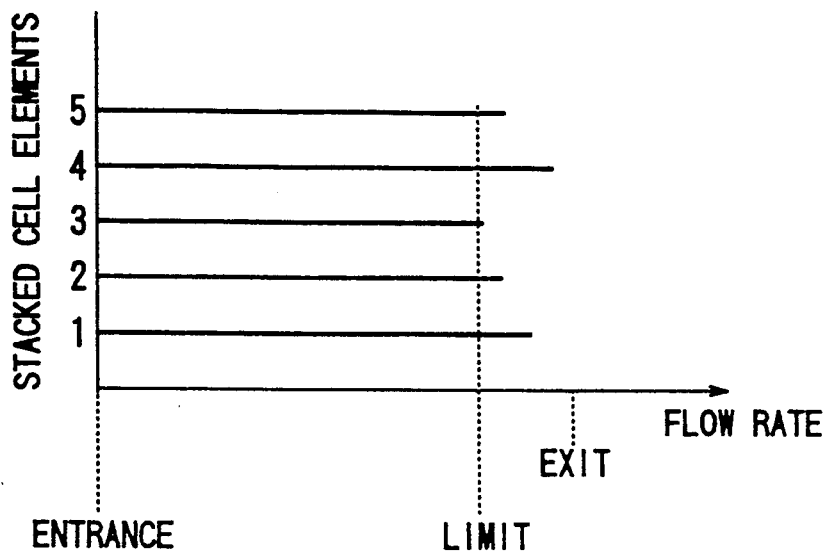
FIG. 7 shows a flow rate distribution of a fuel cell stack.
Figure 8:
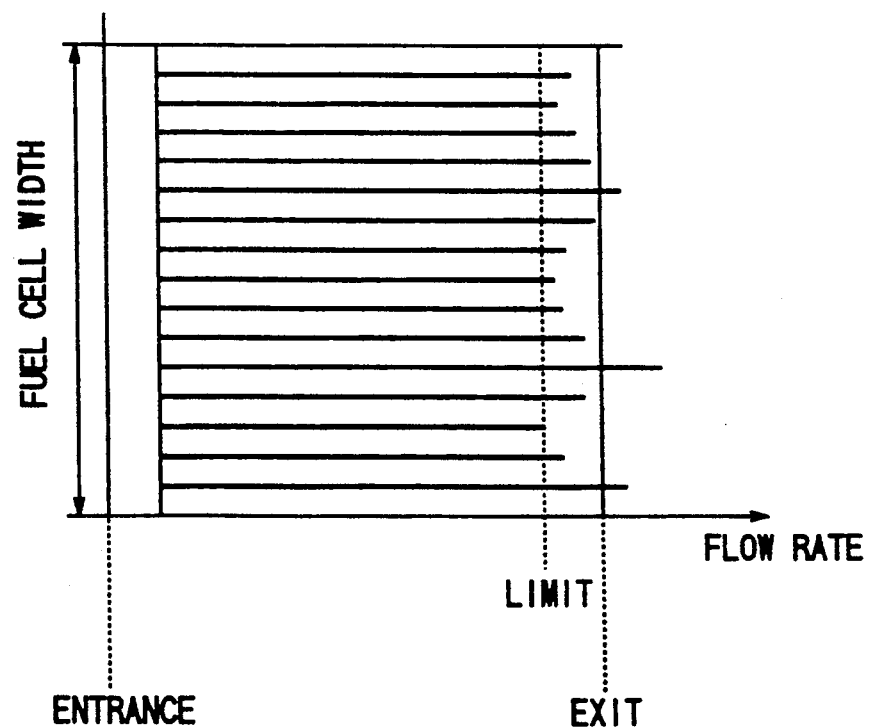
FIG. 8 shows a flow rate distribution of a single fuel cell element.

The fuel gas FG supplied to the anode 103 of the first fuel cell stack I reacts with carbonate ion $CO_3^-$ which has been produced upon the reaction at the cathode 102 and has migrated to the anode 103 through the electrolyte plate 101, whereby the fuel gas is consumed at the anode 103. The anode gas from the anode 103 of the first fuel cell stack I is directly introduced to the anode 103 of the second fuel cell stack II so that remaining fuel gas (all the fuel gas is not used in the upstream anode 103) is used in the reaction at the downstream anode. Therefore, even if a fuel utilization factor of each anode is low, a total fuel utilization factor is high. For example, in a case where the fuel utilization factors $V_f$ of the first and second fuel cells I and II are both 70%, the fuel utilization factor of the first fuel cell stack I is 70% ($=100\% \times 0.7$) and the fuel utilization factor of the second fuel cell stack II is 21% ($=(100-70)\% \times 0.7$). Therefore, the total fuel utilization factor is 91% ($=70\%+21\%$). This value is considered very high in the art. As a result, a power generation efficiency at a transmission end is raised. In this case, since the fuel utilization factors of the fuel cell stack I and II can be set low respectively, a partial fuel shortage does not occur and an output voltage of the system does not become lower than a designed value even if a gas flow rate distribution in the fuel cell stack in a height direction of the stack and a gas flow rate distribution in each fuel cell element are not homogeneous as shown in FIGS. 7 and 8.

The flow rate of the gas introduced to the anode of the fuel cell is generally smaller than that of the cathode. Thus, the gas flow rate distribution of the anode is more inhomogeneous than that of the cathode. However, if two fuel cells are connected in series, like this embodiment, the gas flow rate across the anode is raised. (If two fuel cells are connected in parallel, the gas flow rate across the anode is also raised, but the in-series connection can raise the flow rate more.) Accordingly, the gas flow rate distribution of the anode is improved in this embodiment. Further, since the cooling device 140 is provided between the cathode 102 of the upstream fuel cell stack I and the cathode 102 of the downstream fuel cell stack II, the cathode gas from the upstream cathode is cooled before it is introduced to the downstream cathode. This means that the cathode gas from the upstream cathode can be directly introduced to the downstream cathode. Thus, a total amount of the cathode gas of the system can be reduced as compared with a case where the fuel cell stacks I and II are provided in a parallel relation. This cathode gas reduction results in an increase of $CO_2$ concentration in the cathode gas, thereby raising an output voltage of the fuel cell stack system and reducing a power for the cathode gas recirculation blower. If the same amount of cathode gas as the parallel-provided fuel cell system is supplied to the series-provided fuel cell system, an amount of cathode gas flowing through each cathode of the series-provided fuel cell system is larger than the parallel-provided fuel cell system so that it is possible to reduce a temperature difference between an entrance and an exit of the fuel cell system. If the exit temperature of the series-provided fuel cell system is equal to the exit temperature of the parallel-provided fuel cell system due to a electrolyte loss, the entrance temperature of the series-provided fuel cell system is higher than the parallel-provided fuel cell system since the amount of gas passing through the series-provided fuel cell system is larger than the parallel-provided fuel cell system and the entrance-exit temperature difference of the series-provided fuel cell system is smaller than the parallel-provided fuel cell system. Accordingly, the operation temperature of the series-provided fuel cell system is higher than the parallel-provided fuel cell system and the output voltage of the former fuel cell system is larger than the latter fuel cell system. In addition, the S/C ratio can be lowered since the higher the fuel cell system operation temperature is, the lower the possibility of carbon deposition (precipitation) reaction ($2CO \rightarrow CO_2 + C$) at the anode entrance is. Consequently, even if an amount of steam for the reformation is reduced and the S/C ratio is made smaller, the carbon precipitation does not occur at the anode entrance. Therefore, the fuel concentration at the anode becomes higher and the amount of steam for the reformation can be reduced. This improves a system efficiency.

The sensible heat of the gases discharged from the combustion chamber 130b of the reformer 130 is used for the steam generation in the steam super heater 145 and the steam generators 146 and 147. The generated steam is added to the natural gas NG by the steam line 153.

Figure 2:
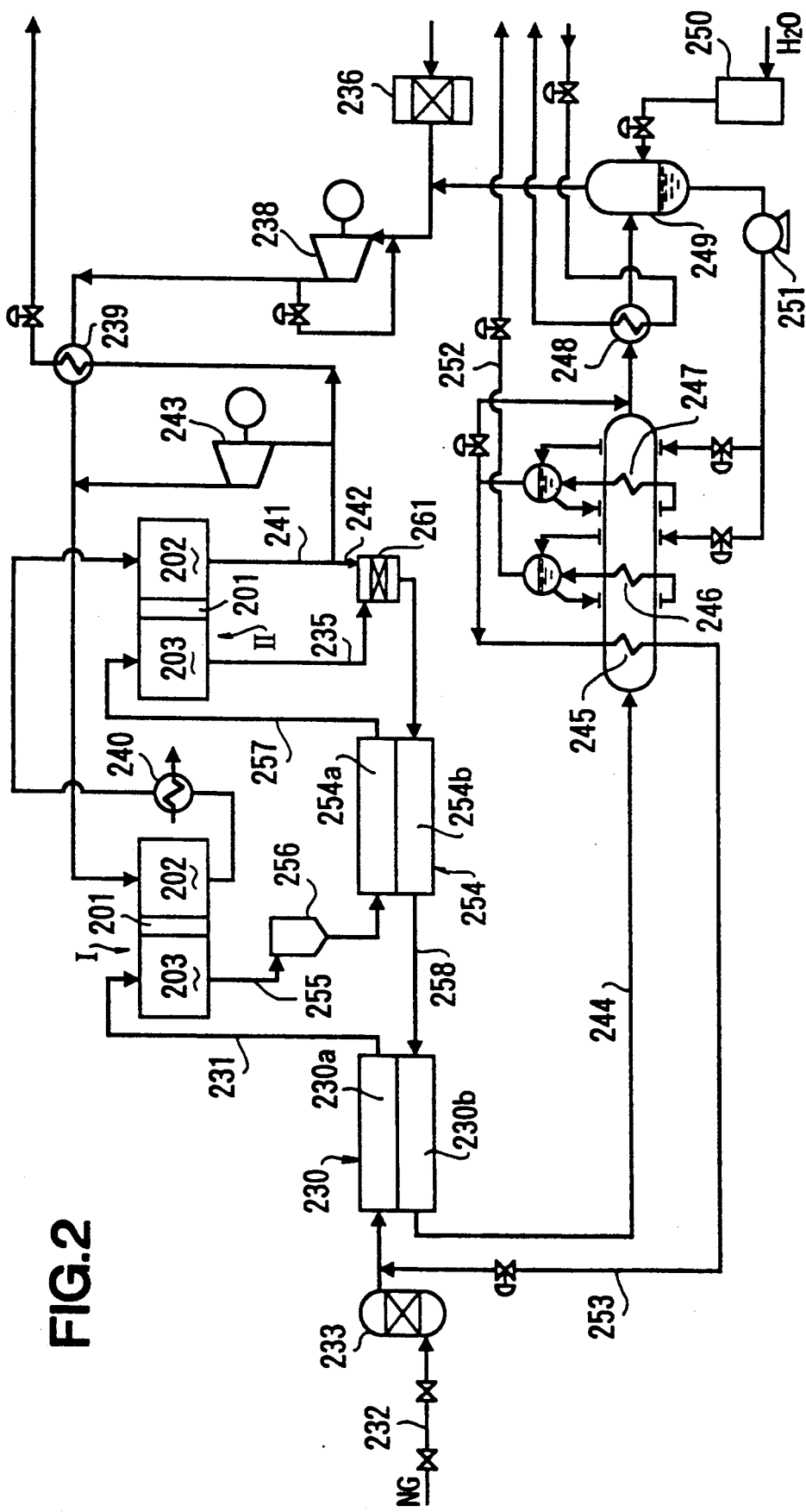

Referring to FIG. 2, there is provided another reformer 254 in addition to the reformer 230, which corresponds to the reformer 153 (FIG. 1), as compared with FIG. 1. The reforming chamber 230a of the upstream reformer 230, the anode 203 of the upstream fuel cell stack I, the reforming chamber 254a of the downstream reformer 254 and the anode 203 of the downstream fuel cell stack II are connected in series. Specifically, an exit of the reforming chamber 230a of the upstream reformer 230 is connected to an entrance of the anode 203 of the upstream fuel cell stack I by a fuel gas feed line 231. An exit of the anode 203 of the upstream fuel cell stack I is connected to an entrance of the reforming chamber 254a of the downstream reformer 254 by an anode gas line 255. A carbonate scrubber 256 is provided on the anode gas line 255. An exit of the reforming chamber 254a of the downstream reformer 254 is connected to an entrance of the anode 203 of the downstream fuel cell stack II by a fuel gas feed line 257. In order to use combustion heat of the downstream reformer 254 as heat source for the upstream reformer 230, the heating chambers 230b and 254b of the two reformers 230 and 254 are connected by a line 258. In order to use sensible heat of gases discharged from the upstream reformer 230 for the steam generation, there is provided an exhaust gas line 244. Other structure is same as FIG. 1 and similar numerals (100 is pulsed) are assigned to like elements.

In the embodiment of FIG. 2, the raw material gas NG flows through the upstream reformer 230, the anode 203 of the upstream fuel cell stack I and the downstream reformer 254. Therefore, following advantages can be expected in addition to the advantages expected in the embodiment of FIG. 1: (i) Since the reforming efficiency of the upstream reformer 230 can be set lower than that of the downstream reformer 254, heat other than the heat of the downstream reformer 254 may be used as the heat source for the upstream reformer 230; (ii) Hydrogen is consumed upon a reaction at the anode 203 of the upstream fuel cell stack I and steam generated upon this reaction is supplied to the reforming chamber 254a of the downstream reformer 254. Further, combustible components among the anode gas discharged from the anode 203 of the downstream fuel cell stack II are burned in the catalyst combustor 261 and heat generated upon this combustion is used as heat source for the second reformer 254. Therefore, the reforming temperature of the second reformer 254 becomes high and the reforming rate or efficiency of the second reformer 254 is raised; and (iii) Since the steam for the reformation in the second reformer 254 is fed from the anode 203 of the first fuel cell stack I, an amount of steam to be added to the raw material gas is reduced. Accordingly, the S/C ratio is lowered. As the S/C ratio becomes lower, the carbon precipitation might occur. However, the operation temperature of the fuel cell system is set high so as to prevent the carbon precipitation in to the present invention.

Figure 3:
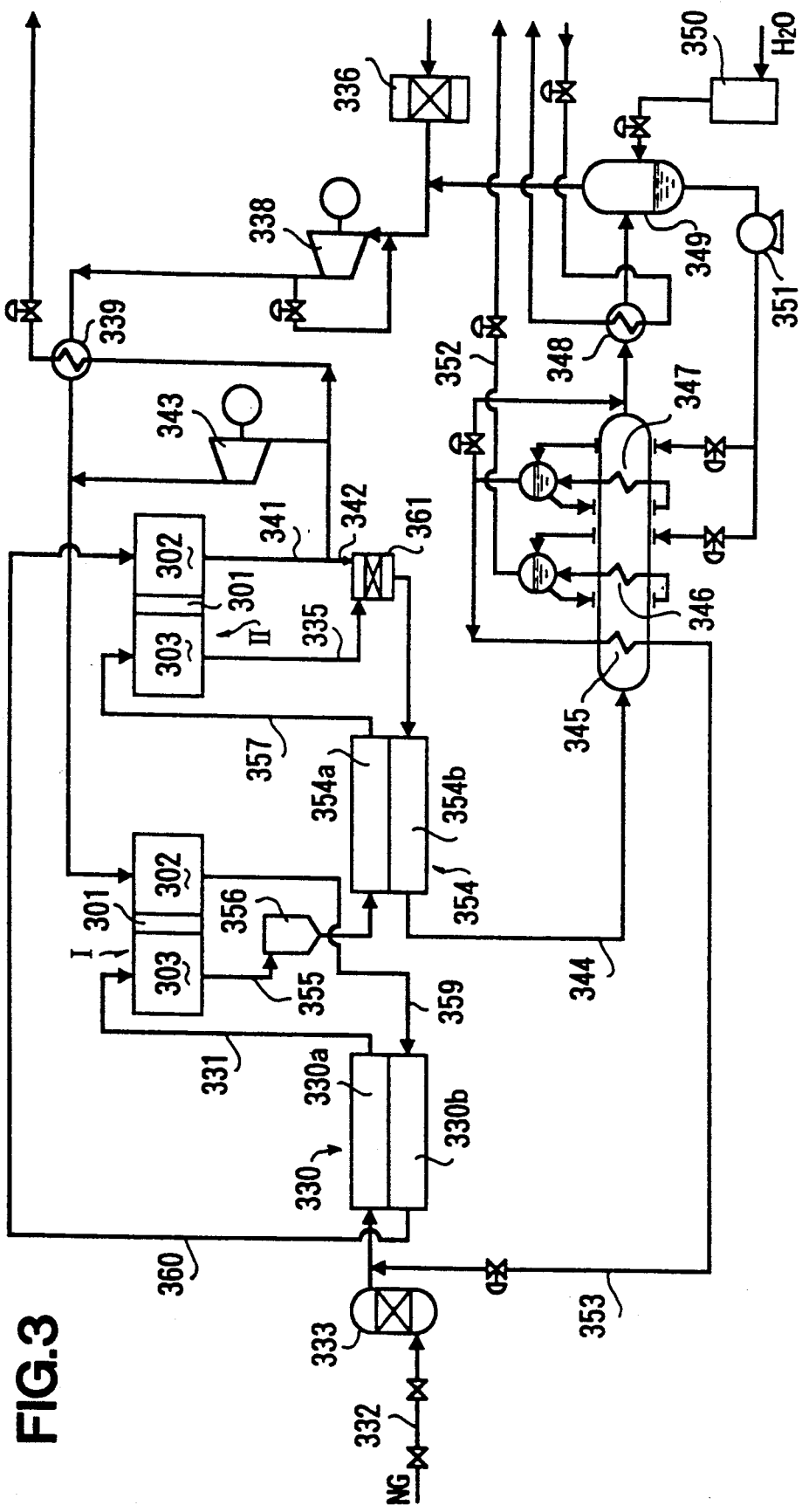

FIG. 3 shows another embodiment of the present invention. Like the system shown in FIG. 2, a first (upstream) reformer 330 and 354 a first (upstream) fuel cell stack I, a second (downstream) reformer 354 and a second (downstream) fuel cell stack II are provided in series. Specifically, a reforming chamber 330a of the upstream reformer 330, an anode 303 of the upstream fuel cell stack I, a reforming chamber 354a of the downstream reformer 354 and an anode 303 of the downstream fuel cell stack II are connected in series. In this embodiment, a cathode gas line 359 extending from a cathode 302 of the upstream fuel cell stack I reaches a heating chamber 330b of the upstream reformer 330. Further, the exit of the heating chamber 330b of the upstream reformer 330 is connected to the entrance of the cathode 302 of the downstream fuel cell stack II by an exhaust gas line 360. Other structure is same as the system of FIG. 2 and like numerals (100 is added) are assigned to like elements.

In the embodiment of FIG. 3, following additional advantages are obtained: (i) Since the reforming rate of the upstream reformer 330 can be set lower than that of the downstream reformer 354, it is possible to directly use sensible heat of the cathode gas of the upstream fuel cell stack I as heat source for the reformation in the upstream reformer 330. Consequently, fuel used to produce heat for the reformation is reduced; (ii) Since the cathode gas of the upstream fuel cell stack I is cooled by the upstream reformer 330, the upstream reformer 330 serves as an intermediate cooling device so that the exhaust gas from the upstream reformer 330 can be directly introduced to the cathode 302 of the downstream fuel cell stack II. Consequently, even if the cooling device 140 (FIG. 1) or 240 (FIG. 2) is not provided, comes out almost the same result as the FIGS. 1 or 2 embodiment; and (iii). Since heat required for the reformation in the downstream reformer 354 is small, heat which the system has can be used for other purposes such as for steam generation. In such a case, a larger amount of steam can be produced and an amount of steam recovered is raised.

Figure 4:
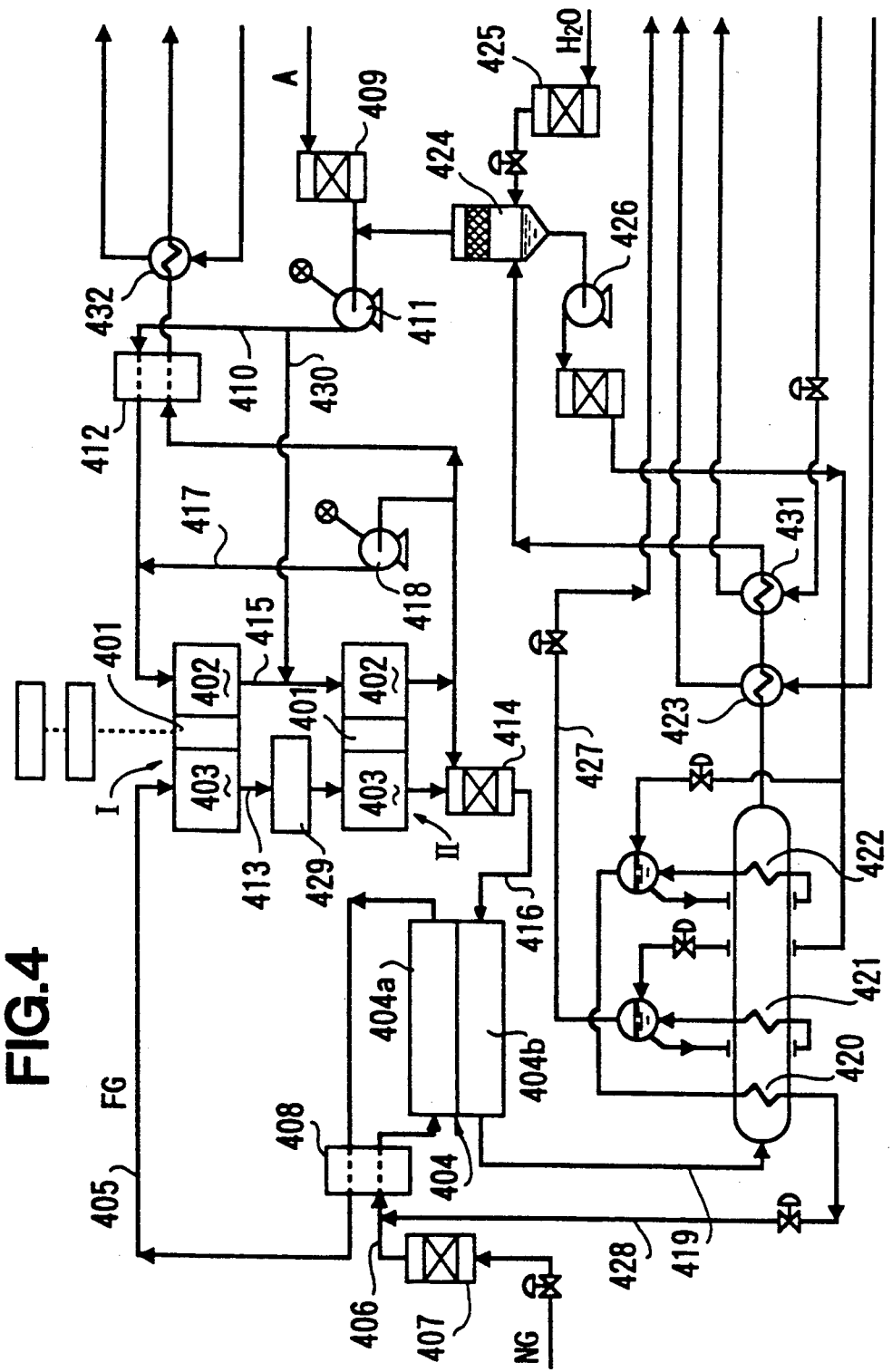
Figure 9:
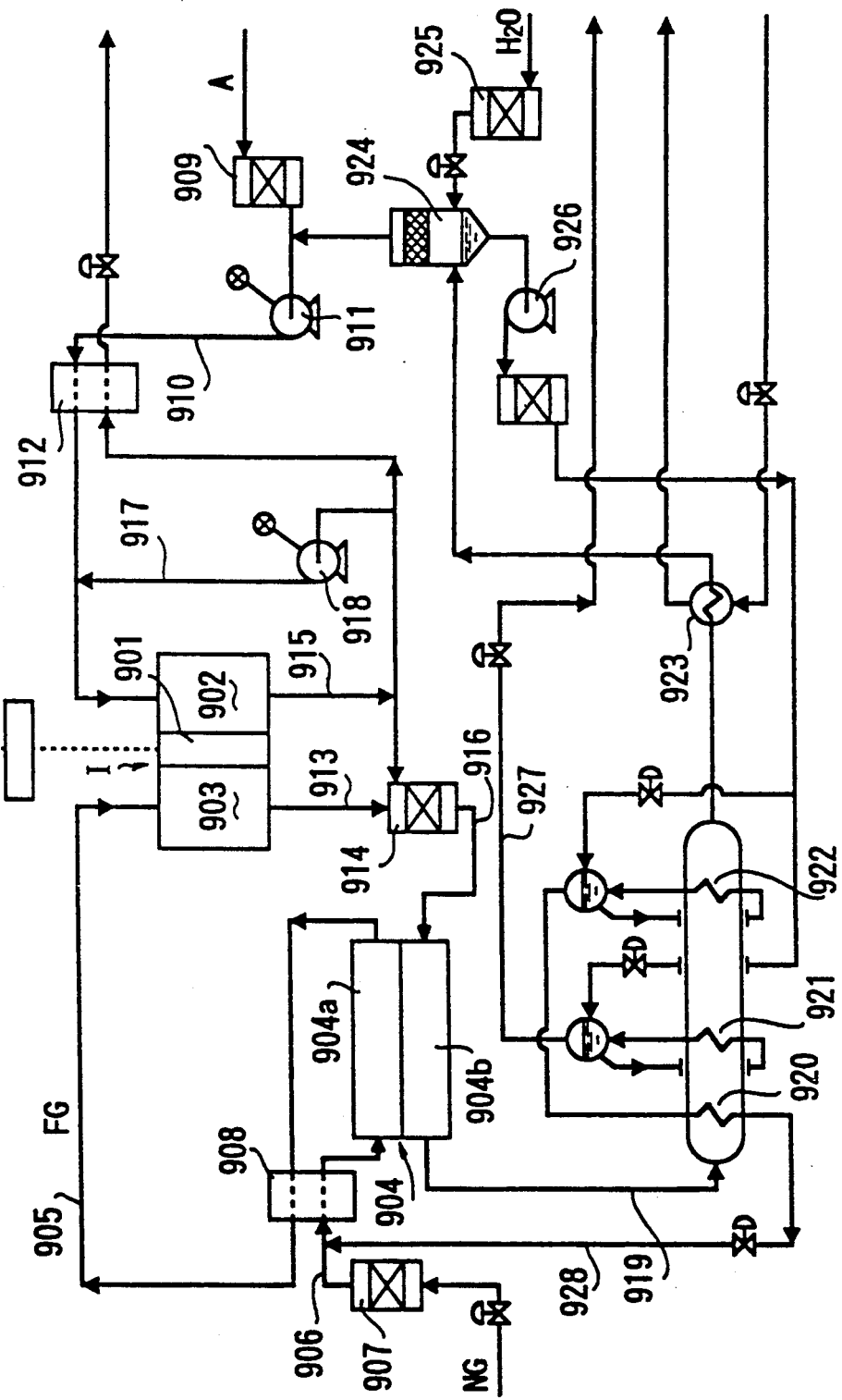
FIG. 9 illustrates another conventional power generation system.

FIG. 4 shows another power generation system according to the present invention. Like the system of FIG. 9, a first (upstream) fuel cell stack I includes a plurality of fuel cell elements (only one fuel cell element is shown for illustrative purpose). Each fuel cell element includes an electrolyte plate 401, a cathode 402 and an anode 403. The fuel cell elements are stacked one after another via separators (not shown). Air A (oxidizing gas) is supplied to the cathode 402 of the fuel cell stack I while fuel gas FG is supplied to the anode 403. A first reformer 404 is provided upstream of the first fuel cell stack I. Raw material gas (for instance, natural gas) is introduced to the reformer 404 and reformed into the fuel gas. A reforming chamber (first reforming chamber) 404a of the reformer 404 is connected to an entrance of the first fuel cell stack I by a fuel gas feed line 405. Combustible components among the anode gas are burned in a catalyst combustor 414 using part of the cathode gas. In order to use heat produced upon this combustion as heat source for the reformer 404, a heating chamber 404b of the reformer 404 is connected to the catalyst combustor 414 by a combustion exhaust gas line 416. A second fuel cell stack II is provided downstream of the first fuel cell stack I. The second fuel cell stack II has a structure similar to the first fuel cell stack I. A second reforming chamber 429 is provided between the exit of the anode 403 of the first fuel cell stack I and the entrance of the anode 403 of the second fuel cell stack II. The exit of the cathode 402 of the first fuel cell stack I is directly connected to the cathode 402 of the second fuel cell stack II. The second reforming chamber 429 uses sensible heat of the anode gas from the first fuel cell stack I. The first reforming chamber 404a of the reformer 404, the anode 403 of the first fuel cell stack I, the second reforming chamber 429 and the anode 403 of the second fuel cell stack II are connected in series. The air A is preheated by an air preheater 412 before it is introduced to the cathode 402 of the upstream fuel cell stack I. An air branch line 430 is connected to a cathode exit line 415 such that part of the air A which is not yet preheated is branched from an air feed line 410 and supplied to the entrance of the cathode 402 of the downstream fuel cell stack II. Numeral 431 designates a hot water generator and 432 designates a cathode gas cooling device. Other structure of the system of FIG. 4 is similar to FIG. 9 and like numerals (500 subtracted) are given to like elements.

Natural gas NG is reformed to the fuel gas by the first reforming chamber 404a of the reformer 404 and the fuel gas is supplied to the anode 403 of the first fuel cell stack I by a fuel gas feed line 405. Hydrogen of the fuel gas is consumed upon reaction at the anode 403. Gases discharged from the anode (anode gas) are introduced to the second reforming chamber 429. In the second reforming chamber 429, remaining raw material gas (all the raw material gas is not reformed to the fuel gas in the first reforming chamber) is then reformed using sensible heat of the anode gas and steam generated upon the reaction at the upstream anode 403. The fuel gas produced upon this reformation is supplied to the downstream anode. In this manner, the raw material gas (natural gas) is reformed twice, namely by the first reforming chamber 404a and the second reforming chamber 429. Therefore, steam used for the reformation in the second reforming chamber 429 includes steam produced upon the reaction at the anode 403 of the first fuel cell stack I in addition to steam added for the reformation in the first reformer 404. In addition, since hydrogen is consumed at the anode 403 of the upstream fuel cell stack I, the reforming rate (reforming efficiency) is remarkably set high. Therefore, even if the reforming rate of the first reformer is not set high very much, as compared with a conventional system having only one reformer, the total reforming rate of the system becomes high. Further, the concentration of hydrogen entering the anode 403 of the downstream fuel cell stack II is raised and the output voltage of the fuel cell system is raised.

In this embodiment, since the reforming rate of the first reformer 404 does not have to have a high reforming rate, the reforming temperature does not have to be high. Consequently, the longevity of the reforming catalyst in the reforming chamber 404a is not shortened and the reformer 404 does not suffer from a thermal damage structurally. However, if the reforming temperature was too low, the reforming rate would be lowered extremely. In this embodiment, heat generated upon the combustion in the catalyst combustor 414 (Remaining combustible matters among the anode gas from the downstream fuel cell stack II are burned in the catalyst combustor 414) is used as the heat source for the upstream reformer 404. Therefore, the heating temperature of the heating chamber 404b of the reformer 404 can be maintained above 700° C. Accordingly, it is possible to design the fuel cell system in a manner such that most of the natural gas NG is reformed in the upstream reforming chamber 404a and a small amount of natural gas NG is reformed in the downstream reforming chamber 429. Therefore, the downstream reforming chamber 429 can be designed small and a quantity of the catalyst placed in the reforming chamber 429 becomes small. This is advantageous since the catalyst can be easily replaced when it is deteriorated by the carbonate of the fuel cell.

According to this embodiment, since it is possible to set a relatively low S/C ratio (steam/carbon ratio)—Off course, the S/C ratio is determined in a range in which the carbon precipitation does not occur through—, a quantity of steam necessary for the reformation is reduced. Therefore, steam recovered as a result of exhaust heat recovery can be used for other purposes outside the system. Further, since a quantity of steam required at the anode entrance is reduced, a partial pressure of hydrogen is raised and the output voltage (or power generation efficiency) of the fuel cell system is raised.

Generally there is a possibility that the carbon precipitation occurs since the anode entrance temperature of the downstream fuel cell stack is low. However, the carbon precipitation will not occur since the anode gas from the upstream fuel cell stack I contains a large quantity of steam.

Since the second reforming chamber 429 uses as the heat for the reformation the sensible heat of the anode gas, the temperature of the anode gas introduced to the anode 403 of the downstream fuel cell stack II becomes lower than that of the anode gas discharged from the anode 403 of the upstream fuel cell stack I. Therefore, it is possible to use the anode gas introduced to the anode 403 of the downstream fuel cell stack II for cooling the downstream fuel cell stack II. As a result, a quantity of cooling gas introduced to the cathode 402 of the downstream fuel cell stack II can be reduced.

Figure 5:
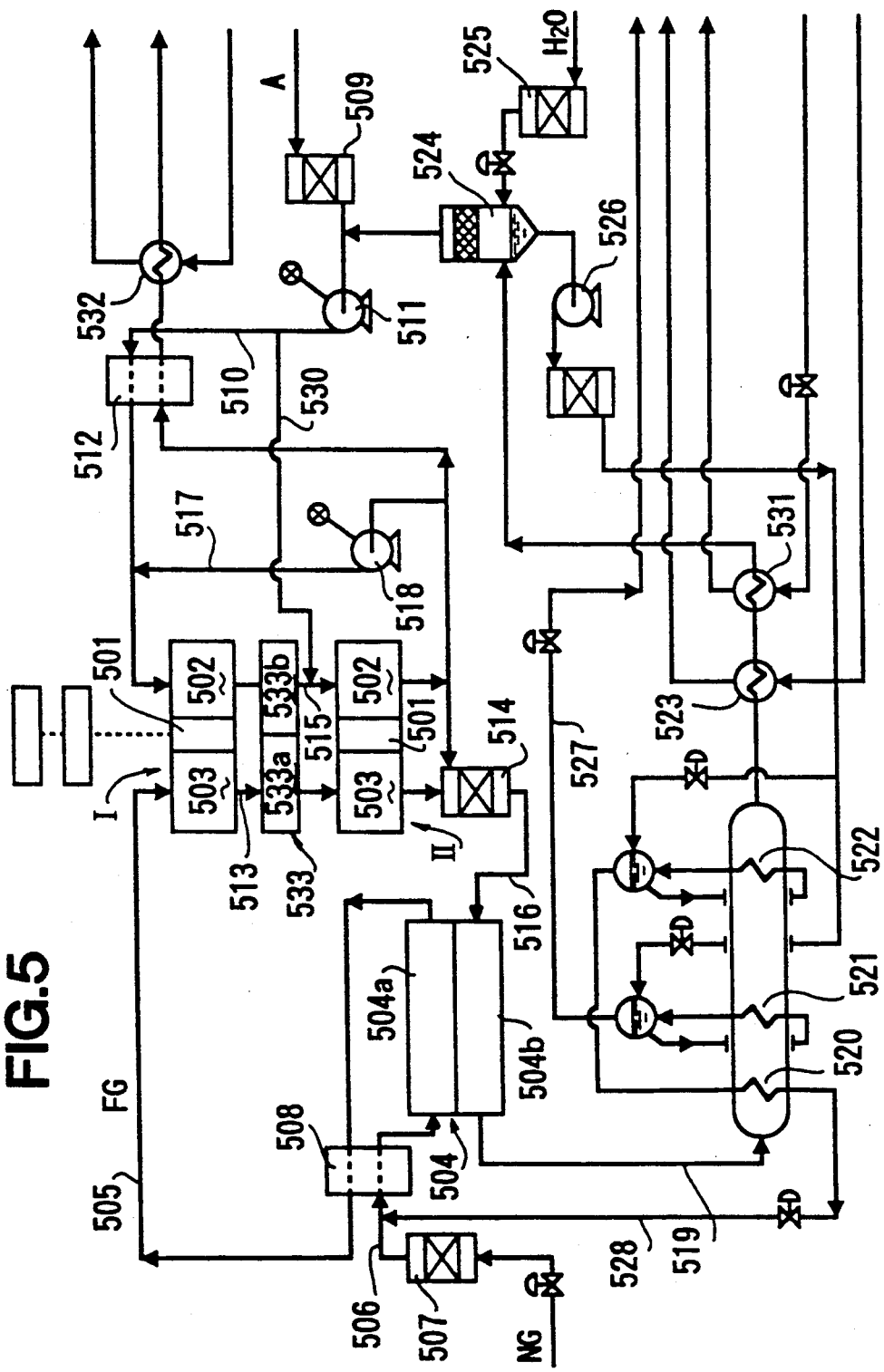
Figure 6:
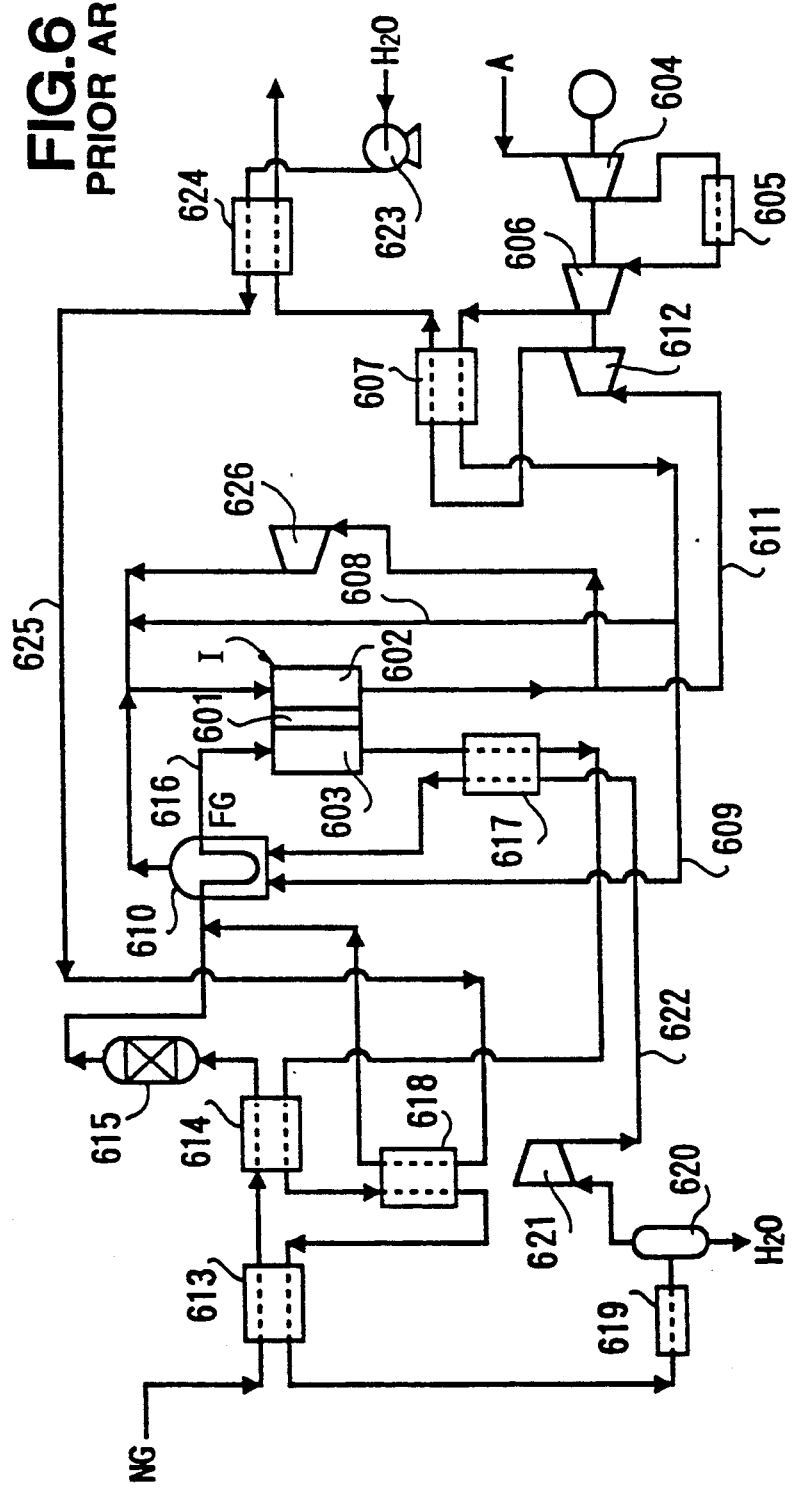
FIG. 6 is a schematic block diagram showing a conventional power generation system.

FIG. 5 shows a modification of the system of FIG. 4. Instead of the second reforming chamber 429 of FIG. 4, there is provided a second reformer 533 between the first and second fuel cell stacks I and II. The anode gas discharged from the anode 503 of the upstream fuel cell stack I flows through the reforming chamber 533a of the second reformer 533 and reaches the anode 503 of the downstream fuel cell stack II. The cathode gas from the cathode 502 of the upstream fuel cell stack I flows through a heating chamber 533b of the second reformer 533 and reaches the cathode 502 of the downstream fuel cell stack II. In this embodiment, the sensible heat of the cathode gas of the first fuel cell stack I is used as the heat for reformation in the second reformer 533. Further, the gases discharged from the heating chamber 533b of the second reformer 533 are introduced to the cathode 502 of the second fuel cell stack II. Therefore, the cathode gas from the first fuel cell stack I is cooled by the second reformer 533 and the cooled cathode gas is used to cool the second fuel cell stack II.

It should be noted that the present invention is not limited to the above-described embodiments. For example, although all the illustrations show the systems having two fuel cell stacks I and II, the power generation system may include three or more fuel cell stacks. Likewise, more than two reformers may be provided. Further, in the system of FIG. 2 (or FIG. 3) heat may be given to the heating chamber 230b (330b) from another heat source and the exhaust gas line 244 (344) may be connected to the exit of the heating chamber 254b (354b).

We claim:

1. A power generation system using fuel cells, comprising:
    a first reformer having a first reforming chamber and a first heating chamber, raw material gas being reformed into fuel gas by the first reforming chamber;
    a first fuel cell having a first anode and a first cathode;
    a fuel gas feed line for introducing the fuel gas into the first anode from the first reforming chamber;
    a second fuel cell having a second anode and a second cathode;
    a first line for introducing into the second anode gases discharged from the first anode;
    a second line for introducing into the second cathode gases discharged from the first cathode; and
    a third line for introducing into the first cathode gases discharged from the first heating chamber.

2. The system of claim 1, wherein the first anode is directly connected to the second anode by the first line.

3. The system of claim 1, wherein gases discharged from the second anode are introduced to the first heating chamber.

4. The system of claim 1, further including a catalyst combustor and wherein gases discharged from the second anode are introduced to the catalyst combustor and then to the first heating chamber.

5. The system of claim 1, further including a filter, a blower and a preheater and wherein oxidizing gas is clarified by the filter, pressurized by the blower and preheated by the preheater before it is introduced to the first cathode.

6. The system of claim 1, further including a cooling device and wherein gases discharged from the first cathode are cooled by the cooling device and then introduced to the second cathode.

7. The system of claim 4, wherein part of the gases discharged from the second cathode is introduced to the catalyst combustor.

8. The system of claim 5, wherein part of the gases discharged from the second cathode is introduced to the oxidizing gas preheater.

9. The system of claim 1, wherein part of the gases discharged from the second cathode is recirculated to the first cathode.

10. The system of claim 1, wherein gases discharged from the second anode and gases discharged from the second cathode are introduced to the first heating chamber.

11. The system of claim 1, further including a steam generator and wherein gases discharged from the first heating chamber are introduced to the steam generator and steam generated in the steam generator is added to the raw material gas.

12. The system of claim 1, further including a second reformer having a second reforming chamber and a second heating chamber and wherein the first reforming chamber, the first anode, the second reforming chamber and the second anode are connected in series.

13. The system of claim 12, wherein gases discharged from the second anode and gases discharged from the second cathode are introduced to the second heating chamber and then to the first heating chamber.

14. The system of claim 12, wherein a reforming rate of the first reformer is lower than the reforming rate of the second reformer.

15. The system of claim 11, wherein gases discharged from the first cathode are introduced to the first heating chamber.

16. The system of claim 12, wherein gases discharged from the first heating chamber are introduced to the second cathode and then to the first cathode.

17. The system of claim 1, further including a second reforming chamber and wherein the first anode, the second reforming chamber and the second anode are connected in series and the first cathode and the second cathode are connected in series.

18. The system of claim 17, further including a catalyst combustor and wherein gases discharged from the second anode and gases discharged from the second cathode are introduced to the catalyst combustor and then to the first heating chamber.

19. The system of claim 17, further including an air preheater and wherein air preheated by the air preheater is introduced to the first cathode and air not preheated by the air preheater is introduced to the second cathode.

20. The system of claim 1, further including a second reformer having a second reforming chamber and a second heating chamber and wherein gases discharged from the first anode are introduced to the second reforming chamber and then to the second anode and gases discharged from the first cathode are introduced to the second heating chamber and then to the second cathode.

* * * * *

UNITED STATES PATENT AND TRADEMARK OFFICE
CERTIFICATE OF CORRECTION

PATENT NO. : 5,221,586
DATED : June 2~~1~~2, 1993
INVENTOR(S) : Hiromasa Morimoto, et al It is certified that error appears in the above-indentified patent and that said Letters Patent is hereby corrected as shown below:

On the title page, Item [75]: Inventors:

Inventor's name "Kenichi Shinozaka" should be -- Kenichi Shinozaki --

Signed and Sealed this

Twenty-fifth Day of January, 1994

Attest:

BRUCE LEHMAN

Attesting Officer   Commissioner of Patents and Trademarks